US010852780B2

(12) United States Patent
Yang et al.

(10) Patent No.: US 10,852,780 B2
(45) Date of Patent: Dec. 1, 2020

(54) CASING AND TERMINAL

(71) Applicant: GUANGDONG OPPO MOBILE TELECOMMUNICATIONS CORP., LTD., Guangdong (CN)

(72) Inventors: Le Yang, Guangdong (CN); Haiping Zhang, Guangdong (CN)

(73) Assignee: GUANGDONG OPPO MOBILE TELECOMMUNCATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/671,909

(22) Filed: Nov. 1, 2019

(65) Prior Publication Data

US 2020/0064891 A1 Feb. 27, 2020

Related U.S. Application Data

(63) Continuation of application No. PCT/CN2018/083424, filed on Apr. 17, 2018.

(30) Foreign Application Priority Data

May 12, 2017 (CN) .......................... 2017 1 0342831

(51) Int. Cl.
*G06F 1/16* (2006.01)
*G06K 9/00* (2006.01)
*H04M 1/02* (2006.01)

(52) U.S. Cl.
CPC .......... *G06F 1/1686* (2013.01); *G06F 1/1652* (2013.01); *G06K 9/00013* (2013.01); *H04M 1/0268* (2013.01); *G06F 1/1626* (2013.01)

(58) Field of Classification Search
CPC combination set(s) only.
See application file for complete search history.

(56) References Cited

U.S. PATENT DOCUMENTS

| 2006/0001651 | A1 | 1/2006 | Weng et al. |
| 2013/0108124 | A1 | 5/2013 | Wickboldt et al. |
| 2014/0133715 | A1* | 5/2014 | Ballard ................. G06F 3/0425 382/124 |

(Continued)

FOREIGN PATENT DOCUMENTS

| CN | 105184228 | 12/2015 |
| CN | 205068222 | 3/2016 |

(Continued)

OTHER PUBLICATIONS

WIPO, ISR for PCT/CN2018/083424, dated Jun. 27, 2018.

(Continued)

*Primary Examiner* — Ganiyu A Hanidu
(74) *Attorney, Agent, or Firm* — Hodgson Russ LLP

(57) ABSTRACT

The present disclosure provides a casing applied to a terminal that includes a flexible display screen. A top surface of the casing supports the flexible display screen. The casing defines a mounting slot. The mounting slot includes an opening defined in the top surface. The mounting slot receives a fingerprint recognition unit of the terminal, such that the fingerprint recognition unit is disposed between the flexible display screen and the casing. The present disclosure further provides a terminal including the casing.

18 Claims, 7 Drawing Sheets

(56) References Cited

U.S. PATENT DOCUMENTS

| | | | | |
|---|---|---|---|---|
| 2015/0245513 | A1* | 8/2015 | Moon | G06F 1/20 |
| | | | | 361/679.01 |
| 2016/0202726 | A1* | 7/2016 | Seen | G02B 6/0088 |
| | | | | 349/42 |
| 2016/0381014 | A1* | 12/2016 | Kim | G06F 1/1694 |
| | | | | 726/7 |
| 2017/0115701 | A1* | 4/2017 | Bae | G06F 1/1652 |
| 2017/0153743 | A1* | 6/2017 | Kim | G02B 6/0036 |
| 2017/0170863 | A1* | 6/2017 | Liu | G06F 1/1626 |
| 2017/0346164 | A1* | 11/2017 | Kim | H04M 1/0266 |
| 2019/0188445 | A1* | 6/2019 | Chi | A61B 5/1172 |

FOREIGN PATENT DOCUMENTS

| | | |
|---|---|---|
| CN | 105872137 | 8/2016 |
| CN | 106203337 | 12/2016 |
| CN | 106331233 | 1/2017 |
| CN | 106339125 | 1/2017 |
| CN | 205983304 | 2/2017 |
| CN | 106662900 | 5/2017 |
| CN | 107241468 | 10/2017 |
| CN | 107257396 | 10/2017 |

OTHER PUBLICATIONS

EPO, Office Action for EP Application No. 18799164.1, dated Jan. 8, 2020.
EPO, Communication Pursuant to Article 94(3) EPC, European Application No. 18799164.1, dated Jul. 2, 2020.

* cited by examiner

CASING AND TERMINAL

CROSS-REFERENCE TO RELATED APPLICATIONS

This application is a continuation of International Application No. PCT/CN2018/083424, filed on Apr. 17, 2018, which claims priority to Chinese Patent Application No. 201710342831.0, filed on May 12, 2017, the entire disclosures of which are incorporated herein by reference.

TECHNICAL FIELD

The present disclosure relates to the technology field of communication devices, and more particularly to a casing and a terminal including the casing.

BACKGROUND

At present, front sides of mobile phones are generally provided with a fingerprint recognition unit and a display screen. The fingerprint recognition unit and the display screen overlap with each other to increase a screen ratio of the mobile phone. In addition, a foldable terminal is formed via a flexible display screen, such that display via a large display screen can be realized. However, the flexible display screen may not bear external pressure. When the fingerprint recognition unit is directly fixed to the flexible display screen via a whole-surface fitting method, the flexible display screen is easy to wrinkle. As a result, light path is changed when light passes through the flexible display screen, and accordingly the fingerprint recognition unit has low fingerprint recognition accuracy.

SUMMARY

In one aspect, a casing is provided. The case is applied to a terminal including a flexible display screen. The casing includes a top surface supporting the flexible display screen. The casing defines a mounting slot. The mounting slot includes an opening defined in the top surface. The mounting slot is configured to receive a fingerprint recognition unit of the terminal.

In another aspect, a terminal is further provided. The terminal includes a flexible display screen, a fingerprint recognition unit, and a casing. The casing includes a top surface supporting the flexible display screen. The casing defines a mounting slot. The mounting slot includes an opening defined in the top surface. The mounting slot is configured to receive the fingerprint recognition unit of the terminal, such that the fingerprint recognition unit is located between the flexible display screen and the casing. The flexible display screen is attached to the top surface.

In a yet another aspect, a terminal includes a flexible display screen, a fingerprint recognition unit, and a casing. The casing includes a top surface supporting the flexible display screen. The casing defines a mounting slot below the top surface. The mounting slot extends through the top surface and defines an opening in the top surface. A fingerprint recognition unit is received in the mounting slot via the opening. The flexible display screen is disposed on the top surface and spaced apart from the at least fingerprint recognition.

BRIEF DESCRIPTION OF THE DRAWINGS

To better illustrate the technical solutions of the present disclosure, the following descriptions will briefly illustrate the accompanying drawings described in the embodiments. Obviously, the following described accompanying drawings merely illustrate some embodiments of the present disclosure. Those skilled in the art may obtain other accompanying drawings according to the described accompanying drawings without creative efforts.

DETAILED DESCRIPTION

Figure 1:
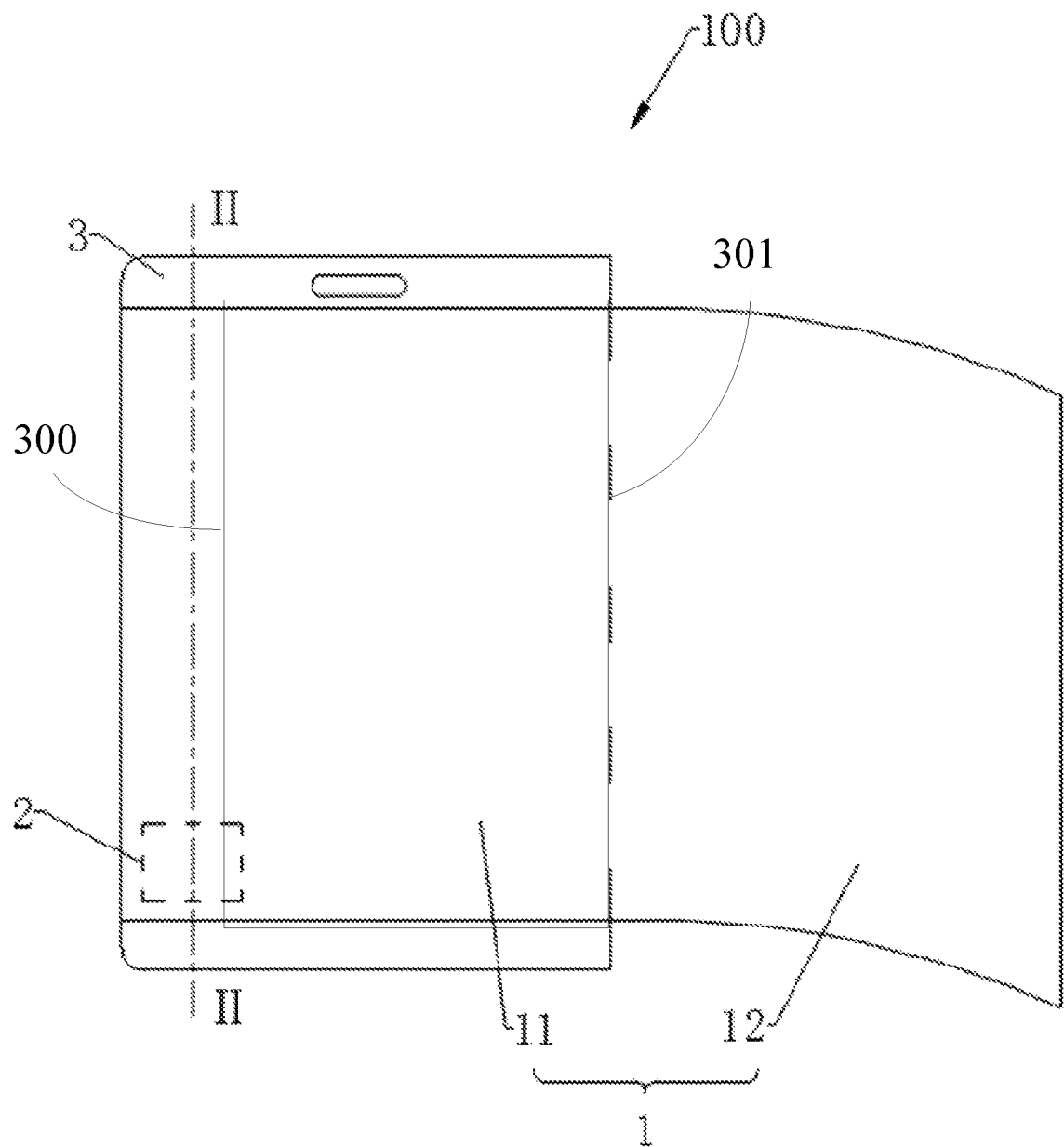
FIG. 1 is a schematic structural view of a terminal according to an embodiment of the present disclosure.

The technical solutions of embodiments of the present disclosure will be described in combination with the accompanying drawings.

A casing is provided. The case is applied to a terminal including a flexible display screen. The casing includes a top surface supporting the flexible display screen. The casing defines a mounting slot. The mounting slot includes an opening defined in the top surface. The mounting slot is configured to receive a fingerprint recognition unit of the terminal.

The fingerprint recognition unit is attached to a bottom wall of the mounting slot. The bottom wall of the mounting slot and the top surface define an angle less than or equal to 5 degrees.

The mounting slot has a depth greater than a thickness of the fingerprint recognition unit.

A difference between the depth of the mounting slot and the thickness of the fingerprint recognition unit is greater than or equal to 0.1 mm.

The difference between the depth of the mounting slot and the thickness of the fingerprint recognition unit is greater than or equal to 0.15 mm and less than or equal to 0.25 mm.

The mounting slot includes a limiting surface formed on sidewalls of the mounting slot. A facing surface of the fingerprint recognition unit facing the flexible display screen is in contact with the limiting surface.

The limiting surface and the top surface define an angle less than or equal to 5 degrees.

A distance between the limiting surface and the top surface is greater than or equal to 0.1 mm.

A curved transition surface is formed between the top surface and the limiting surface.

The curved transition surface and the limiting surface cooperatively form a limiting block. The limiting block protrudes from the sidewalls of the mounting slot. The limiting block deforms by an external force.

The bottom wall is provided with a pressing member. The pressing member presses the fingerprint recognition unit against the limiting surface.

The pressing member is flexible.

A number of protrusions are provided on the sidewalls of the mounting slot. The protrusions are spaced apart from each other and distributed around the mounting slot.

The casing further defines a receiving space defined therein. The receiving space, the top surface, and the mounting slot are spaced apart from each other. The receiving space is configured to receive a mainboard of the terminal.

The casing further includes a wire-laying channel defined therein for wires to pass. The wire-laying channel communicates with the mounting slot and the receiving space.

The casing further includes a bottom surface opposite the top surface. The flexible display screen includes a fixing portion and a free portion. The fixing portion is attached to the top surface; the free portion is bent to be in contact with the bottom surface or is received in the casing.

The casing further includes a receiving cavity spaced apart from the top surface. The receiving cavity includes an opening defined between the top surface and the bottom surface.

The casing includes a first body, a second body, and a bending assembly. The first body includes a first mounting surface for mounting the flexible display screen. The second body includes a second mounting surface for mounting the flexible display screen. The bending assembly is disposed between the first body and the second body, and includes a third mounting surface for mounting the flexible display screen. The first mounting surface, the second mounting surface, and the third mounting surface cooperatively form the top surface of the casing. The mounting slot is defined in one of the first body or the second body.

The casing includes a first body, a second body, and a bending assembly. The first body includes a first mounting surface for mounting the flexible display screen. The second body includes a second mounting surface for mounting the flexible display screen. The bending assembly is disposed between the first body and the second body, and includes a third mounting surface for mounting the flexible display screen. The first mounting surface, the second mounting surface, and the third mounting surface cooperatively form the top surface of the casing. The mounting slot is embodied as two mounting slots. One of the two mounting slots is defined in the first body, and includes an opening defined in the first mounting surface. The other one of the two mounting slots is defined in the second body, and includes an opening defined in the second mounting surface.

A terminal is further provided. The terminal includes a flexible display screen, a fingerprint recognition unit, and a casing. The casing includes a top surface supporting the flexible display screen. The casing defines a mounting slot. The mounting slot includes an opening defined in the top surface. The mounting slot is configured to receive the fingerprint recognition unit of the terminal, such that the fingerprint recognition unit is located between the flexible display screen and the casing. The flexible display screen is attached to the top surface.

A mobile includes a flexible display screen, a fingerprint recognition unit, and a casing. The casing includes a top surface supporting the flexible display screen. The casing defines a mounting slot below the top surface. The mounting slot extends through the top surface and defines an opening in the top surface. A fingerprint recognition unit is received in the mounting slot via the opening. The flexible display screen is disposed on the top surface and spaced apart from the fingerprint recognition.

Figure 2:
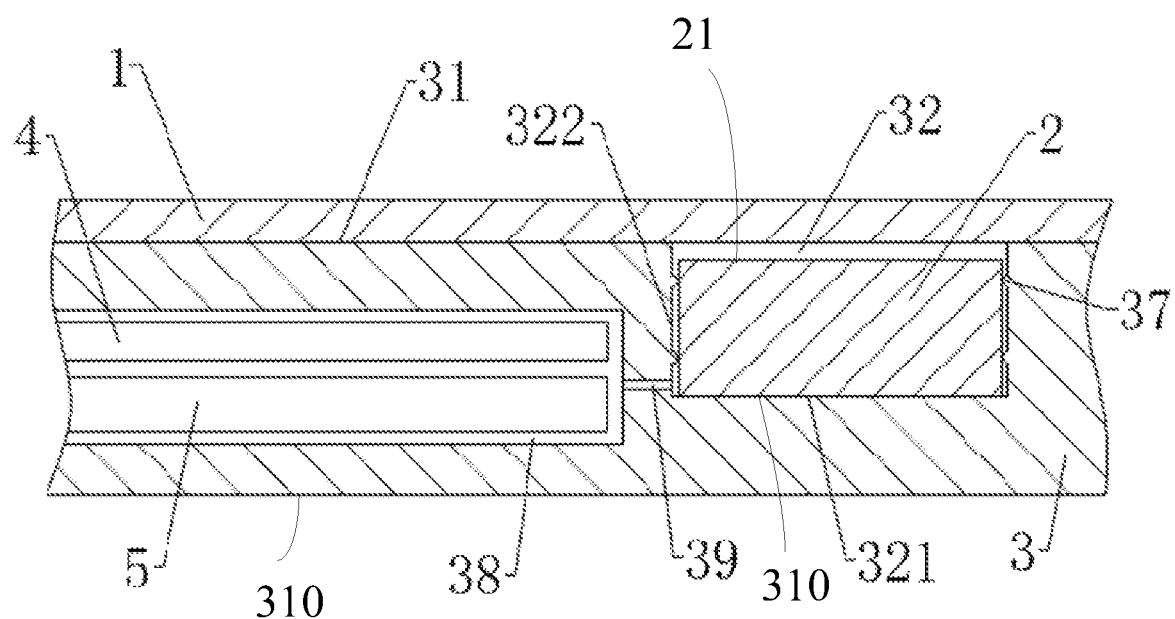
FIG. 2 is a cross-sectional view of the terminal illustrated in FIG. 1 taken along a line II-II.
Figure 3:
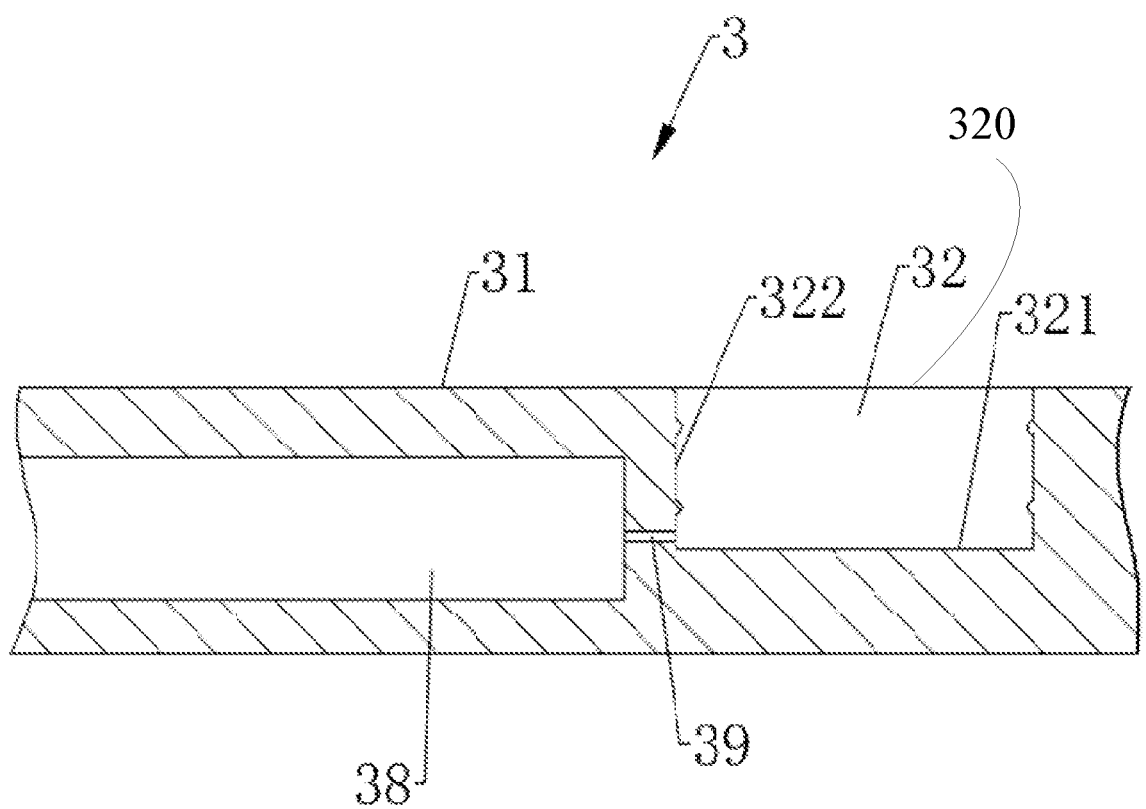
FIG. 3 is a schematic structural view of a casing illustrated in FIG. 2.

As illustrated in FIGS. 1 to 3, an embodiment of the present disclosure provides a terminal 100. The terminal 100 may be a mobile phone, a tablet computer, a laptop computer, or the like.

The terminal 100 includes a flexible display screen 1, a fingerprint recognition unit 2, and a casing 3. A top surface 31 of the casing 3 supports the flexible display screen 1. The casing 3 defines a mounting slot 32, where the mounting slot 32 extends through the top surface 31 and an opening 320 is defined in the top surface 31. The fingerprint recognition unit 2 is received in the mounting slot 32 via the opening 320. The mounting slot 32 includes a bottom wall 321, and sidewalls 322 connected between four edges of the bottom wall 321 and the top surface 31. The flexible display screen 1 is attached to the top surface 31, and the fingerprint recognition unit 2 is received in the mounting slot 32, such that the fingerprint recognition unit 2 is disposed between the flexible display screen 1 and the casing 3, and the fingerprint recognition unit 2 is spaced apart from the flexible display screen 1.

In the embodiment, in assembly of the terminal 100, the fingerprint recognition unit 2 is first disposed in the mounting slot 32 of the casing 3, and then the flexible display screen 1 is laid on the top surface 31 of the casing 3. In this way, the fingerprint recognition unit 2 is disposed between the flexible display screen 1 and the casing 3, and the fingerprint recognition unit 2 is located below the flexible display screen 1. When light passes through the flexible display screen 1 and enters the fingerprint recognition unit 2, the fingerprint recognition unit 2 is capable of recognizing user's fingerprint in contact with the flexible display screen 1.

The fingerprint recognition unit 2 and the flexible display screen 1 of the terminal 100 are fixed and positioned via the casing 3. In the assembly of the terminal 100, the flexible display screen 1 may be directly laid on the top surface 31 without bearing pressure from the fingerprint recognition unit 2. In this way, the flexible display screen 1 may be prevented from wrinkling, that is, the flexible display screen 1 remains flat. As a result, light may pass through the flexible display screen 1 and enter the fingerprint recognition unit 2 along an original light path, and accordingly the fingerprint recognition unit 2 has high fingerprint recognition accuracy.

As illustrated in FIG. 1, in one embodiment, the casing 3 includes a bottom surface 310 opposite the top surface 31. The flexible display screen 1 includes a fixed portion 11 and a free portion 12. The fixing portion 11 is attached to the top surface 31. The free portion 12 is bent to be in contact with the bottom surface 310 or be received in the casing 3. Thus, the fingerprint recognition unit 2 is located below the fixing portion 11.

The casing 3 defines a receiving cavity 300 spaced apart from the top surface 31 for receiving the free portion 12. The receiving cavity 300 includes an opening 301 located between the top surface 31 and the bottom surface 310.

Figure 4:
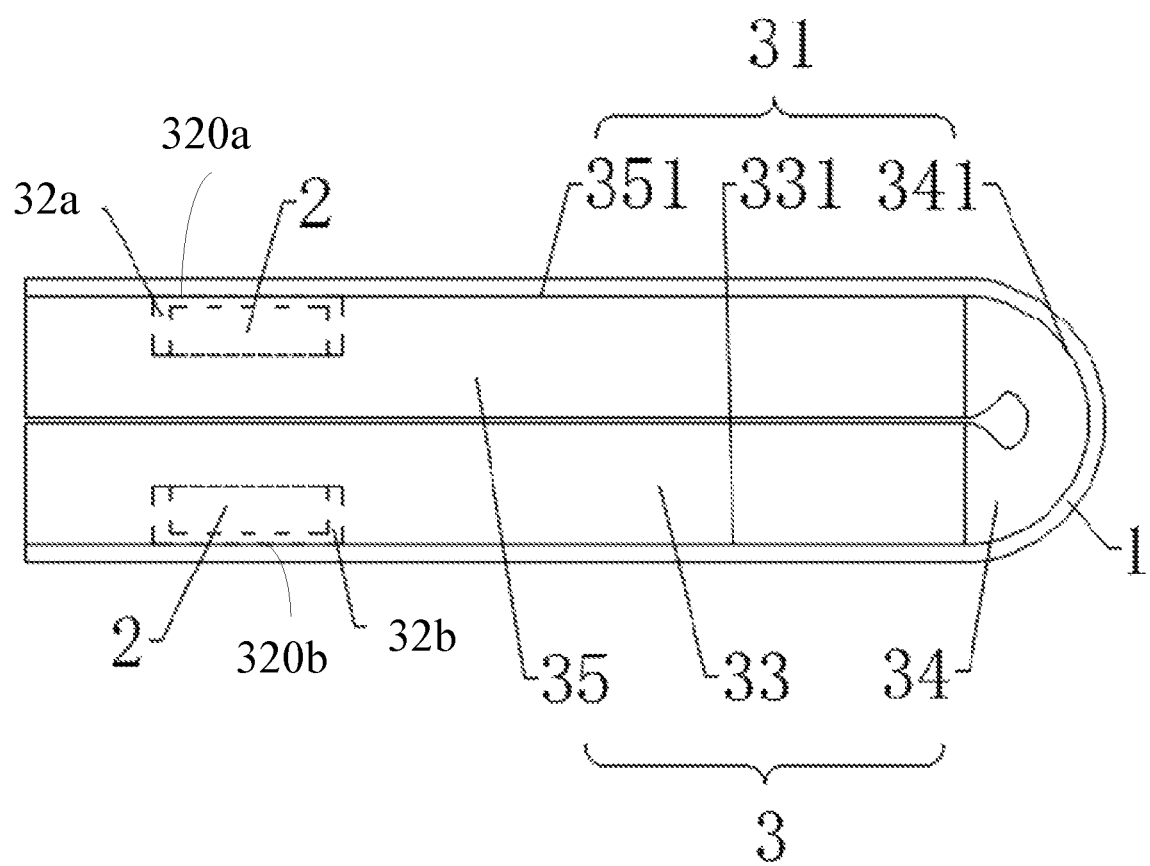
FIG. 4 is a schematic view of a terminal according to another embodiment of the present disclosure.

As illustrated in FIG. 4, in another embodiment, a terminal in this embodiment is similar to that in the FIGS. 1 to 3 except that the casing 3 includes a first body 35, a second body 33, and a bending assembly 34. The first body 35 includes a first mounting surface 351 for mounting the flexible display screen 1. The second body 33 includes a second mounting surface 331 for mounting the flexible display screen 1. The bending assembly 34 is coupled between the first body 35 and the second body 33. The bending assembly 34 includes a third mounting surface 341 for mounting the flexible display screen 1. The bending assembly 34 enables the first body 35 to be folded or unfolded relative to the second body 33.

In the embodiment, the first mounting surface 351, the second mounting surface 331, and the third mounting surface 341 cooperatively form the top surface 31 of the casing 3. A mounting slot 32a may be defined in the first body 35, where the mounting slot 32a extends through the mounting surface 351 and an opening 320a is defined in the first mounting surface 351, and/or a mounting slot 32b may be defined in the second body 33, where the mounting slot 32b extends through the second mounting surface 331 and an opening 320b is defined in the second mounting surface 331. As a result, the fingerprint recognition unit 2 may be disposed in the first body 35 or the second body 33, or two fingerprint recognition units 2 may be respectively received in the first body 35 and the second body 33.

For example, the flexible display screen 1 is a bendable display panel. The flexible display screen 1 may be a touch screen capable of implementing display and touch functions. The flexible display screen 1 may be an organic light-emitting diode (OLED) display panel. The fingerprint recognition unit 2 is configured to recognize the user's fingerprint via light. In an example, the light recognized by the fingerprint recognition unit 2 may be emitted by the fingerprint recognition unit 2 and reflected by the user's finger after passing through the flexible display screen 1. In another example, the light recognized by the fingerprint recognition unit 2 may be emitted from the flexible display screen 1 and reflected by the user's finger, and the light reflected passes through the flexible display screen 1 and enters the fingerprint recognition unit 2.

As illustrated in FIGS. 1 to 4, the fingerprint recognition unit 2 is attached to the bottom wall 321 of the mounting slot 32. The fingerprint recognition unit 2 may be adhered to the bottom wall 321.

It can be understood that, the flexible display screen 1 is attached to the top surface 31, such that the flexible display screen 1 may be substantially parallel to the top surface 31. A relative positional relationship is defined between a signal collection surface 21 of the fingerprint recognition unit 2 and an attaching surface 23 of the fingerprint recognition unit 2 attached to the bottom wall 321, where the attaching surface 23 is opposite to the signal connection surface 21. The attaching surface 23 and the signal collection surface 21 may be parallel to each other, or define a predetermined angle therebetween the attaching surface 23 and the signal collection surface 21. In the embodiment, the attaching surface 23 and the signal collection surface 21 are parallel to each other.

For example, the bottom wall 321 and the top surface 31 may cooperatively define an angle less than or equal to 5 degrees.

In the embodiment, a relative positional relationship between the flexible display screen 1 and the signal collection surface 21 of the fingerprint recognition unit 2 is defined via defining a relative positional relationship between the bottom wall 321 and the top surface 31. When the signal collection surface 21 is substantially parallel to the flexible display screen 1, or the signal collection surface 21 and the flexible display screen 1 cooperatively define a small angle, the signal collection surface 21 may well receive the light passing through the flexible display screen 1. Therefore, the fingerprint recognition unit 2 has high recognition accuracy.

In the embodiment, a depth of the mounting slot 32 is greater than a thickness of the fingerprint recognition unit 2. As such, the fingerprint recognition unit 2 not only may be completely received in the mounting slot 32, but also a gap may be formed between the fingerprint recognition unit 2 and the flexible display screen 1, that is, the fingerprint recognition unit 2 and the flexible display screen 1 are spaced from each other at a distance. Therefore, the difficulty of attaching the flexible display screen 1 to the top surface 31 is reduced, the quality of attaching is improved, the product yield of the terminal 100 increases, and the fingerprint recognition unit 2 has high recognition accuracy.

For example, the depth of the mounting slot 32 may be at least 0.1 mm larger than the thickness of the fingerprint recognition unit 2, such that the distance between the fingerprint recognition unit 2 and the flexible display screen 1 may be greater than or equal to 0.1 mm. In other words, the difference between the depth of the mounting slot 32 and the thickness of the fingerprint recognition unit 2 may be greater than or equal to 0.1 mm.

Furthermore, the distance may be greater than or equal to 0.15 mm, and less than or equal to 0.25 mm. For example, the distance may be 0.2 mm. In other words, the difference may be greater than or equal to 0.15 mm and less than or equal to 0.25 mm.

In an embodiment, as illustrated in FIG. 1, and FIG. 5 to FIG. 7, a limiting surface 323 is formed in the sidewalls 322 of the mounting slot 32. A facing surface 22 of the fingerprint recognition unit 2 facing the flexible display screen 1 be in contact with the limiting surface 323.

In the embodiment, the limiting surface 323 limits a movement of the fingerprint recognition unit 2 in a direction toward which the flexible display screen 1 emits light. The fingerprint recognition unit 2 and the flexible display screen 1 have a proper relative positional relationship via setting the limiting surface 323, thereby further improving the recognition accuracy of the fingerprint recognition unit 2.

It can be understood that, the flexible display screen 1 is attached to the top surface 31, such that the flexible display screen 1 may be substantially parallel to the top surface 31. The relative positional relationship is defined between the signal collection surface 21 of the fingerprint recognition unit 2 and the facing surface 22 of the fingerprint recognition unit 2 facing the flexible display screen 1. For example, the signal collection surface 21 and the facing surface 22 may be parallel to each other, coplanar, or cooperatively define a predetermined angle therebetween. In the embodiment, the signal collection surface 21 and the facing surface 22 are coplanar.

For example the limiting surface 323 and the top surface 31 may cooperatively define an angle less than or equal to 5 degrees.

In the embodiment, the relative positional relationship between the flexible display screen 1 and the signal collection surface 21 of the fingerprint recognition unit 2 is defined via defining the relative positional relationship between the limiting surface 323 and the top surface 31. When the signal collection surface 21 is substantially parallel to the flexible display screen 1, or the signal collection surface 21 and the flexible display screen 1 cooperatively define a small angle, the signal collection surface 21 may well receive the light passing through the flexible display screen 1. Therefore, the fingerprint recognition unit 2 has higher recognition accuracy.

In the embodiment, a distance between the limiting surface 323 and the top surface 31 may be greater than or equal to 0.1 mm, such that the distance between the fingerprint recognition unit 2 and the flexible display screen 1 may be greater than or equal to 0.1 mm. Therefore, the difficulty of attaching the flexible display screen 1 to the top surface 31 is reduced, the quality of attaching is improved, the product yield of the terminal 100 increases, and the fingerprint recognition unit 2 has high recognition accuracy.

In an embodiment, a curved transition surface 324 is formed between the top surface 31 and the limiting surface 323 for facilitating disposing the fingerprint recognition unit 2 in the mounting slot 32. Thus, the curved transition surface 324 and the limiting surface 323 cooperatively form a limiting block 325 protruding from the sidewalls 322.

In the embodiment, the limiting block 325 is deformable. The limiting block 325 deforms by an external force. After the fingerprint recognition unit 2 is disposed in the mounting slot 32, the external force is removed, and the limit block 325 is restored to its original state. The difficulty of the assembly of the fingerprint recognition unit 2 is reduced via setting the curved transition surface 324.

In an embodiment, a pressing member 36 is disposed at the bottom wall 321 of the mounting slot 32. The pressing member 36 deforms by an external force. The pressing member 36 presses the fingerprint recognition unit 2 against the limiting surface 323. The bottom wall 321, the pressing member 36, and the limiting surface 323 cooperate to limit the movement of the fingerprint recognition unit 2. In addition, the process tolerance may be compensated via the pressing member 36, such that the difficulty of the assembly of the fingerprint recognition unit 2 is reduced.

The pressing member 36 is flexible. For example, the pressing member 36 is an elastic member, such as a spring, foam, rubber, or the like. Of course, in other embodiments, the pressing member 36 may also be a flexible member capable of cooperating with the pressing member 36 to press the fingerprint recognition unit 2.

In an embodiment, as illustrated in FIG. 2, FIG. 3, and FIG. 5 to FIG. 7, the sidewalls 322 are provided with a number of protrusions 37. The protrusions 37 are spaced apart from each other and distributed around the mounting slot 32. The protrusions 37 are in contact with a periphery of the fingerprint recognition unit 2 to limit the fingerprint recognition unit 2. The protrusions 37 are located in a plane perpendicular to a direction toward which the flexible display screen 1 emits light, such that the fingerprint recognition unit 2 is omnidirectionally limited. As a result, the fingerprint recognition unit 2 may be fixed and positioned in the casing 3.

Figure 5:
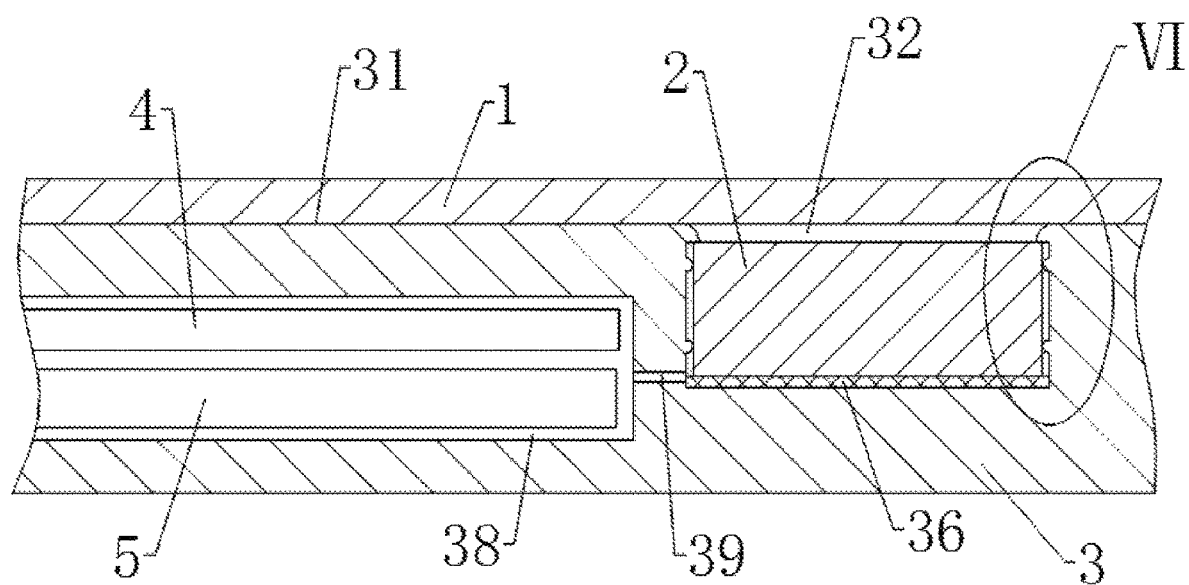
FIG. 5 is another cross-sectional view of the terminal illustrated in FIG. 1 taken along the line II-II.
Figure 6:
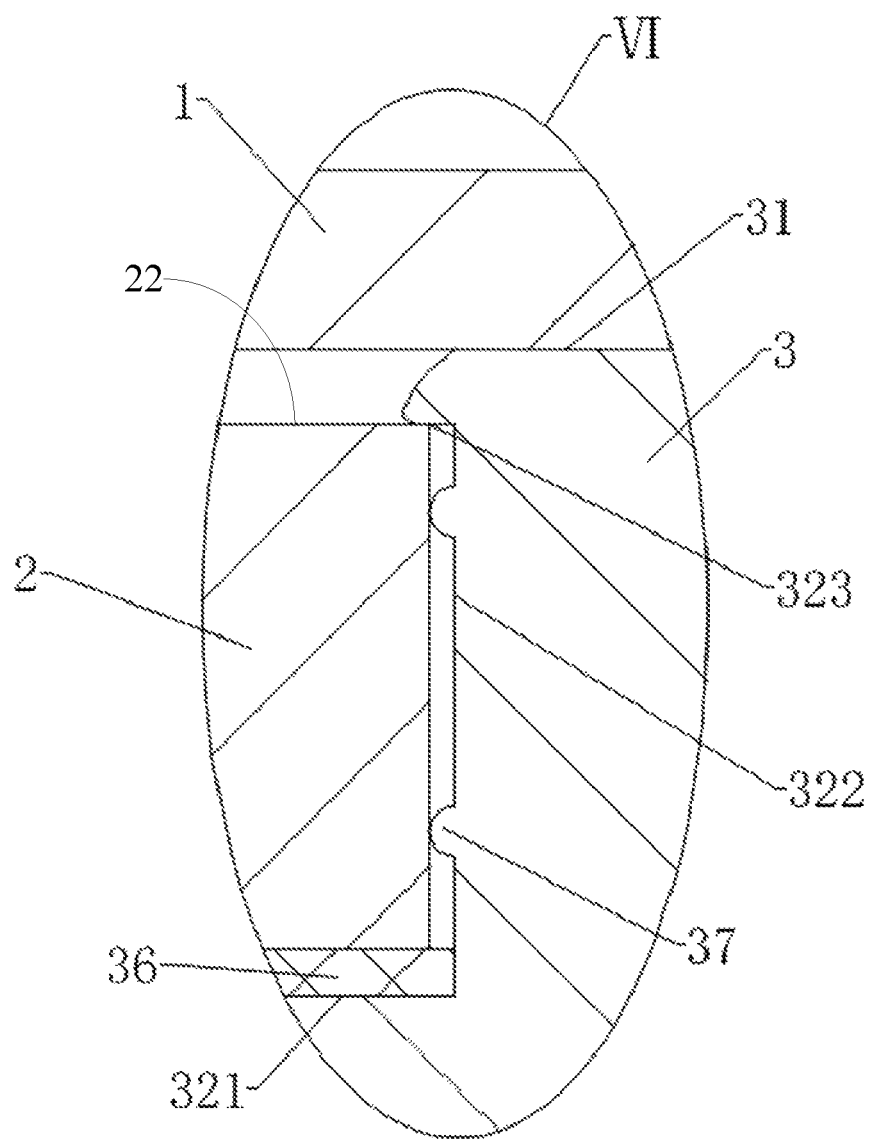
FIG. 6 is an enlarged view of a portion VI of FIG. 5.
Figure 7:
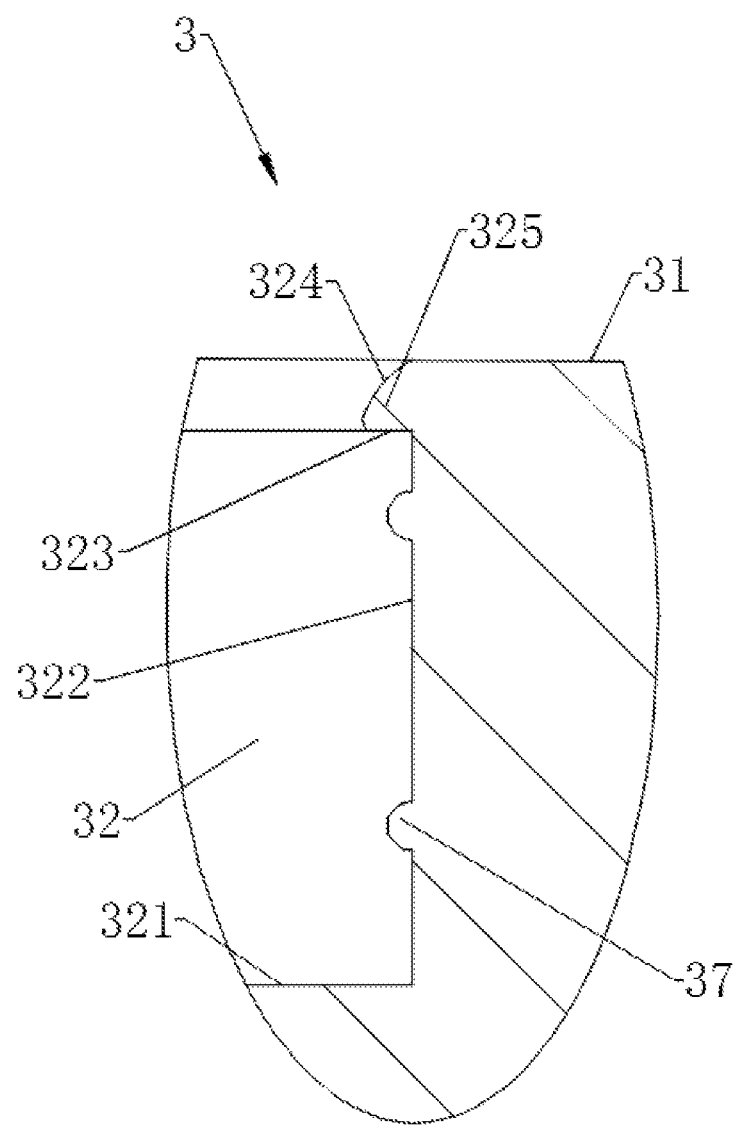
FIG. 7 is a schematic structural view of a casing illustrated in FIG. 6.

In an embodiment, as illustrated in FIG. 2, FIG. 3 and FIG. 5, the casing 3 defines a receiving space 38. The receiving space 38, the top surface 31, and the mounting slots 32 are spaced apart from each other. The receiving space 38 receives a mainboard 4 of the terminal 100. The receiving space 38 may further receive a battery 5 of the terminal 100.

The flexible display screen 1 and the fingerprint recognition unit 2 both are electrically coupled to the mainboard 4. The mainboard 4 controls the flexible display screen 1 to display information and perform touch recognition. The fingerprint recognition unit 2 sends the user's fingerprint collected to the mainboard 4.

In an embodiment, the casing 3 defines a wire-laying channel 39 for wires to pass through. The wire-laying channel 39 communicates with the mounting slot 32 and the receiving space 38. In addition, a flexible circuit board of the fingerprint recognition unit 2 may be coupled to the mainboard 4 via the wire-laying channel 39, thereby implementing an electrical coupling between the fingerprint recognition unit 2 and the mainboard 4.

Of course, in other embodiments, the casing 3 may not be provided with the wire-laying channel 39. The fingerprint recognition unit 2 and the motherboard 4 are electrically coupled via wireless connections.

The embodiments of the present disclosure have been described in detail above. The principles and implementations of the present disclosure are described herein via illustrative examples. The descriptions of the above embodiments are merely to assist in understanding the method and key ideas of the present disclosure. In the meantime, modifications may be made by the skill in art according the spirit of the present disclosure. However, the descriptions of the present disclosure should not be construed to limit the scope of the present disclosure.

What is claimed is:

1. A casing applied to a terminal comprising a flexible display screen, the casing comprising:
    a top surface supporting the flexible display screen;
    a first body comprising a first mounting surface for mounting the flexible display screen;
    a second body comprising a second mounting surface for mounting the flexible display screen;
    a bending assembly disposed between the first body and the second body, the bending assembly comprising a third mounting surface for mounting the flexible display screen;
    wherein the casing defines a mounting slot, wherein the mounting slot comprises an opening defined in the top surface, the mounting slot being configured to receive a fingerprint recognition unit of the terminal;
    wherein the first mounting surface, the second mounting surface, and the third mounting surface cooperatively form the top surface of the casing; and
    wherein one of the following:
        the mounting slot is defined in one of the first body or the second body; and
        a number of the mounting slot is two, wherein one of the two mounting slots is defined in the first body, and comprises an opening defined in the first mounting surface, and wherein the other one of the two mounting slots is defined in the second body, and comprises an opening defined in the second mounting surface.

2. The casing of claim 1, wherein the fingerprint recognition unit is attached to a bottom wall of the mounting slot, wherein the bottom wall of the mounting slot and the top surface define an angle less than or equal to 5 degrees.

3. The casing of claim 2, wherein the mounting slot has a depth greater than a thickness of the fingerprint recognition unit.

4. The casing of claim 3, wherein a difference between the depth of the mounting slot and the thickness of the fingerprint recognition unit is greater than or equal to 0.1 mm.

5. The casing of claim 4, wherein the difference between the depth of the mounting slot and the thickness of the fingerprint recognition unit is greater than or equal to 0.15 mm and less than or equal to 0.25 mm.

6. The casing of claim 1, wherein the mounting slot comprises a limiting surface formed on sidewalls of the mounting slot; a facing surface of the fingerprint recognition unit facing the flexible display screen is in contact with the limiting surface.

7. The casing of claim 6, wherein the limiting surface and the top surface define an angle less than or equal to 5 degrees.

8. The casing of claim 7, wherein a distance between the limiting surface and the top surface is greater than or equal to 0.1 mm.

9. The casing of claim 6, wherein a curved transition surface is formed between the top surface and the limiting surface.

10. The casing of claim 9, wherein the curved transition surface and the limiting surface cooperatively form a limiting block, wherein the limiting block protrudes from the sidewalls of the mounting slot; the limiting block deforms by an external force.

11. The casing of claim 6, wherein the bottom wall is provided with a pressing member, wherein the pressing member presses the fingerprint recognition unit against the limiting surface.

12. The casing of claim 11, wherein the pressing member is flexible.

13. The casing of claim 1, wherein a plurality of protrusions are provided on the sidewalls of the mounting slot, wherein the plurality of protrusions is spaced apart from each other and distributed around the mounting slot.

14. The casing of claim 1, further defining a receiving space therein, wherein the receiving space, the top surface, and the mounting slot are spaced apart from each other, wherein the receiving space is configured to receive a mainboard of the terminal.

15. The casing of claim 14, further defining a wire-laying channel for wires to pass through, wherein the wire-laying channel communicates with the mounting slot and the receiving space.

16. The casing of claim 1, further comprising a bottom surface opposite the top surface, wherein the flexible display screen comprises a fixing portion and a free portion, wherein the fixing portion is attached to the top surface, and the free portion is bent to be in contact with the bottom surface.

17. A terminal comprising:
a flexible display screen;
a fingerprint recognition unit; and
a casing comprising a top surface supporting the flexible display screen; the casing defining a mounting slot, wherein the mounting slot comprises an opening defined in the top surface, the mounting slot being configured to receive the fingerprint recognition unit such that the fingerprint recognition unit is disposed between the flexible display screen and the casing; and
wherein the flexible display screen is attached to the top surface.

18. A terminal comprising:
a casing comprising:
a top surface; and
the casing defining a mounting slot below the top surface, the mounting slot extending through the top surface and defining an opening in the top surface; and
a fingerprint recognition unit received in the mounting slot via the opening; and
a flexible display screen disposed on the top surface and spaced apart from the fingerprint recognition unit.

* * * * *

UNITED STATES PATENT AND TRADEMARK OFFICE
CERTIFICATE OF CORRECTION

Page 1 of 1

PATENT NO. : 10,852,780 B2
APPLICATION NO. : 16/671909
DATED : December 1, 2020
INVENTOR(S) : Yang et al.

It is certified that error appears in the above-identified patent and that said Letters Patent is hereby corrected as shown below:

On the Title Page

Item (73), the Assignee should read:
--(73) Assignee: GUANGDONG OPPO MOBILE
　　　　　　　　　TELECOMMUNICATIONS CORP.,
　　　　　　　　LTD., Guangdong (CN)--

Signed and Sealed this
Nineteenth Day of January, 2021

Andrei Iancu
*Director of the United States Patent and Trademark Office*